Oct. 29, 1940.  B. Y. McCARTY  2,219,691
METHOD OF PRODUCING A WAX CRYSTAL MODIFYING MATERIAL
Original Filed Aug. 22, 1933
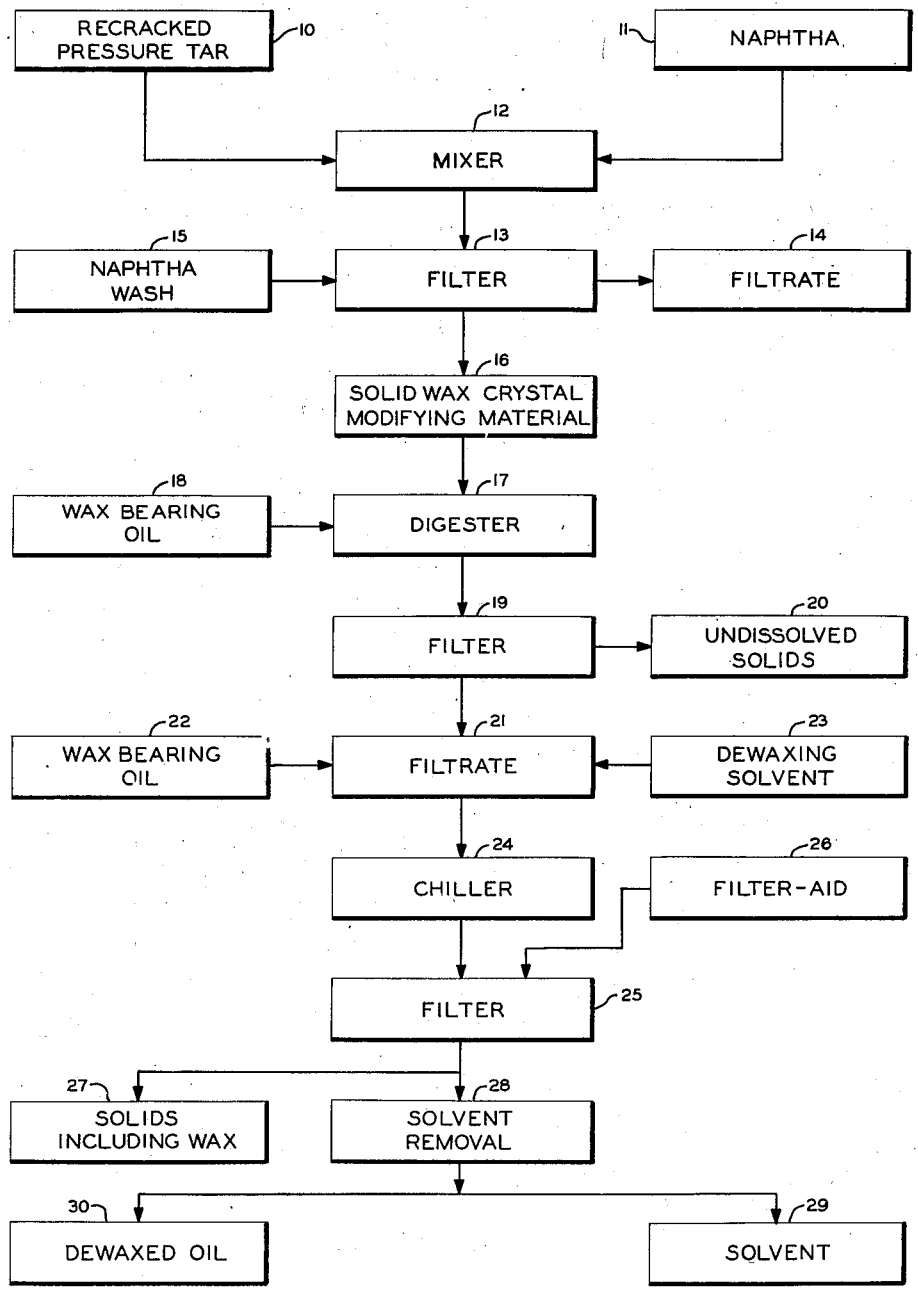
BERNARD Y. McCARTY
INVENTOR
BY
ATTORNEY Patented Oct. 29, 1940

2,219,691

UNITED STATES PATENT OFFICE 2,219,691

METHOD OF PRODUCING A WAX CRYSTAL MODIFYING MATERIAL

Bernard Yale McCarty, Fishkill, N. Y., assignor to The Texas Company, New York, N. Y., a corporation of Delaware Original application August 22, 1933, Serial No. 686,245. Divided and this application March 14, 1939, Serial No. 261,710

2 Claims. (Cl. 196—1)

This invention relates to the preparation of a hydrocarbon material adapted to modify the structure of wax crystals and to facilitate the precipitation of wax from wax-bearing solutions.

This is a division of my co-pending application Serial No. 686,245, filed August 22, 1933, for Separation of wax from hydrocarbon oil, now U. S. Patent No. 2,164,776.

The invention contemplates the preparation from cracked petroleum residues of a hydrocarbon material which, when added to wax-bearing oil, in relatively small proportions, exerts a modifying effect upon the structure of the wax crystals and thereby facilitates precipitation of the wax from a cold wax-bearing solution in a readily separable form.

The invention contemplates the preparation of this modifying material from the cracked residual tars resulting from the cracking of mineral oil for the production of gasoline or motor fuel.

I have found that cracked pressure tar, formed in the usual cracking operations, contains certain constituents which, when added to lubricating oil fractions produced from mixed base and paraffin base crudes, in relatively small proportions, possesses the characteristic of substantially depressing the pour point of the lubricating oil. I have found that the presence of this material in a wax-bearing solution modifies the structure of the wax crystals precipitated from the cold solution to such an extent that they are much more readily separated from this solution by the usual mechanical means, comprising filtration and centrifuging. The presence of this material also facilitates the separation of the wax content by the ordinary cold settling method.

An important advantage of the modifying material of my invention resides in the fact that when mixed with wax-bearing solutions for the purpose of facilitating the removal of the wax, it imparts substantially no bloom or fluorescent color to the dewaxed oil.

While the modifying material itself is of a dark brown color, it imparts no lasting or permanent color effect to the oil undergoing dewaxing, and such color constituents as may be added to the oil from the modifying materials are readily removed in the subsequent acid or other chemical treatment, or vacuum distillation to which dewaxed oil is usually subjected.

The method of preparing this modifying material comprises diluting the cracking still tar with gasoline or light petroleum naphtha in the proportion of about one part of tar to several parts of diluent. Upon standing a precipitate is formed comprising the constituents of the tar which are insoluble in the diluent naphtha. This precipitate can be removed from the dilute mixture preferably by filtration following which the resulting filter cake is washed with additional light naphtha. The washed material is thus obtained in substantially dry and solid form.

For example, one volume of cracked tar, having an A. P. I. gravity of around 1 to −2 and a Furol viscosity of around 30–50 seconds at 210° F. may be mixed with about four volumes of a 60 Bé. naphtha. After complete mixing at normal atmospheric temperature, the mixture is subjected to filtration. The resulting filter cake is washed with fresh naphtha to produce a solid material comprising about 20% by volume of the cracked tar treated. This solid material, which corresponds roughly to a hydrocarbon having the molecular formula $C_{37}H_{29}$, has been found to have approximately the following tests:

| | |
|---|---:|
| Carbon_____per cent__ | 90.54 |
| Hydrogen_____do____ | 5.98 |
| Ash_____do____ | 1.18 |
| Molecular weight _____ | 463–473 |
| Melting point around_____° C__ | 127 |

In dewaxing oil in the presence of the foregoing modifying material, the latter may be dissolved directly in the body of wax-bearing oil to be dewaxed or it may be dissolved in a small portion thereof to form a concentrated solution which is subsequently mixed with the main body of the wax-bearing oil.

Thus I have found it of advantage to mix about one part of the solid modifying material with one or two parts of the wax-bearing oil. This mixture is then digested by heating at a temperature of around 350° F. to thereby produce a concentrated solution of the modifying agent in the wax-bearing oil. If necessary, or if desired, this concentrated solution may be filtered in order to remove any undissolved material that may be present. The temperature of digestion may be varied, as desired, but is usually within the range of 300–400° F. The proportion of modifying material to solvent oil may also be varied, if desired.

This concentrated solution is then mixed with the main body of wax-bearing oil, the former comprising from about one or two percent to ten percent of the total mixture. The whole mixture is then diluted with petroleum naphtha or other suitable dewaxing solvent or diluent liquid, as for example, a mixture of acetone and benzol. The resulting dilute mixture is then chilled to 0° F. or below, depending upon the pour test desired in the dewaxed oil. Following this the chilled mixture is filtered either with or without the presence of a solid, inert filter aid material.

It has been found that the addition of about 6% of the concentrated solution of modifying material in oil, to the total wax-bearing oil, materially increases the rate of filtration over that obtaining when modifying material is not present.

The resulting dewaxed oil is then subjected to such further treatment as may be desired and which may comprise chemical treating, as for example, with sulfuric acid followed by contacting with an adsorbent clay.

The addition of this material to wax-bearing solutions also facilitates more complete removal of the wax from the solution by other dewaxing methods, such as centrifuging or cold settling. This material also exhibits the property of depressing the pour test of paraffin oil and may be so used where there are no restrictions as to color of the treated oil.

The modifying material of my invention may be obtained by the method described from the cracking still tars produced in the usual liquid and vapor phase cracking of mineral oil for the production of motor fuel. It may also be obtained from cracked residues formed by subjecting the foregoing tars to recracking. The tars produced from these sources and which are adapted for the purpose of my invention are viscous pitchy hydrocarbons having a specific gravity roughly equivalent to that of water or even heavier.

The invention is illustrated in the attached drawing which comprises a flow diagram of the process as applied to the use of a re-cracked pressure tar of the type mentioned above. The re-cracked pressure tar 10 is mixed with naphtha 11 in mixer 12 and the mix then passed to filter 13 from which the naphtha extract is discharged to the filtrate tank 14 leaving the naphtha insoluble portion of the recracked pressure tar on the filter. This is washed with naphtha 15, and the resulting solid wax crystal modifying material 16 is then passed to a digester 17 into which is introduced wax-bearing oil 18 to form a concentrate. The resulting mix is passed to filter 19 which removes undissolved solids 20 from the concentrate which is discharged to filtrate tank 21. The concentrate is then mixed in a suitable proportion with the wax-bearing oil 22 which is to be dewaxed and with a suitable dewaxing solvent 23. The wax-bearing oil mix is then passed through a suitable chiller 24 and thence to a filter 25, the filter aid 26 being added if desired. The filter 25 removes the resulting solids including wax 27 from the dewaxed oil filtrate which passes to a solvent removal system 28 where the solvent 29 is stripped from the dewaxed oil 30.

Obviously many modifications and variations of the invention, as hereinbefore set forth, may be made without departing from the spirit and scope thereof, and therefore only such limitations should be imposed as are indicated in the appended claims.

I claim:

1. The method of producing a wax crystal modifying material of the character described, which comprises recracking a cracked pressure tar to a pitchy residue, extracting the pitchy residue with naphtha, separating the naphtha extract from the insoluble residue, commingling the insoluble residue with a lubricating oil to form a concentrated solution of active material, and separating the concentrated solution from remaining insoluble residue.

2. A lubricating oil of lowered pour point comprising a wax containing mineral lubricating oil admixed with a minor proportion of a wax crystal modifying material prepared by recracking a cracked pressure tar to a pitchy residue, extracting the pitchy residue with naphtha, separating the naphtha extract from the insoluble residue, commingling the insoluble residue with a mineral lubricating oil to form a concentrated solution of the active wax crystal modifying material, and separating the concentrated solution from remaining insoluble residue to form a concentrate of the wax crystal modifying material which is added to the wax-containing mineral lubricating oil.

BERNARD YALE McCARTY.